United States Patent
Shteyn

(10) Patent No.: US 7,069,345 B2
(45) Date of Patent: Jun. 27, 2006

(54) DEVICE IDENTIFICATION AND CONTROL IN NETWORK ENVIRONMENT

(75) Inventor: Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 931 days.

(21) Appl. No.: 09/852,467

(22) Filed: May 9, 2001

(65) Prior Publication Data

US 2002/0169914 A1 Nov. 14, 2002

(51) Int. Cl.
*G05F 15/16* (2006.01)
(52) U.S. Cl. ........................ 709/250; 709/208; 709/220; 709/225; 709/228; 710/8; 710/15; 710/36; 710/62; 340/310.11
(58) Field of Classification Search ................ 709/250; 340/310.01, 310.11
See application file for complete search history.

(56) References Cited

U.S. PATENT DOCUMENTS

| | | | |
|---|---|---|---|
| 5,051,720 A * | 9/1991 | Kittirutsunetorn | ..... 340/310.02 |
| 6,005,476 A | 12/1999 | Valiulis | |
| 6,054,846 A * | 4/2000 | Castleman | ................... 323/283 |
| 6,281,784 B1 * | 8/2001 | Redgate et al. | ........ 340/310.01 |
| 6,317,028 B1 * | 11/2001 | Valiulis | ...................... 340/10.1 |
| 6,792,463 B1 * | 9/2004 | Lamberton et al. | ......... 709/227 |
| 2002/0011923 A1 * | 1/2002 | Cunningham et al. | . 340/310.01 |

FOREIGN PATENT DOCUMENTS

WO WO0065774 A 11/2000

OTHER PUBLICATIONS

U.S. Appl. No. 09/210,416 Title"Remote Control Device With Location Dependent Interface".
U.S. Appl. No. 09/653,784 Title "STB Connects Remote to Web Site For Customized Code Downloads".
U.S. Appl. No. 09/519,546 Title" Personalizing CE Equipment Configuration At Sever Via Web-Enabled Device".
U.S. Appl. No. 09/165,682 Title Control Property IS Mapped Onto Modally Compatible Gui Element.
U.S. Appl. No. 09/165,683 Title "Calls Identify Scenario For Control Of Software Objects Via Property Routes".
U.S. Appl. No. 09/133,622 Title " Home-Network Autoconfiguration".
U.S. Appl. No. 09/635,549 Title " Topical Service Provides Context Information For A Home Network".

* cited by examiner

*Primary Examiner*—Kim Huynh
*Assistant Examiner*—Eron Sorrell

(57) ABSTRACT

A control network for home appliances comprises a module for interfacing an appliance to the network. The module adopts the identity of the appliance when the module and the appliance are being interconnected. The appliance comprises a tag, e.g., in its power plug, with identifying information that gets read by the module and transferred to a controller. The module itself can have a location dependent identifier to enable topology dependent software applications.

15 Claims, 8 Drawing Sheets

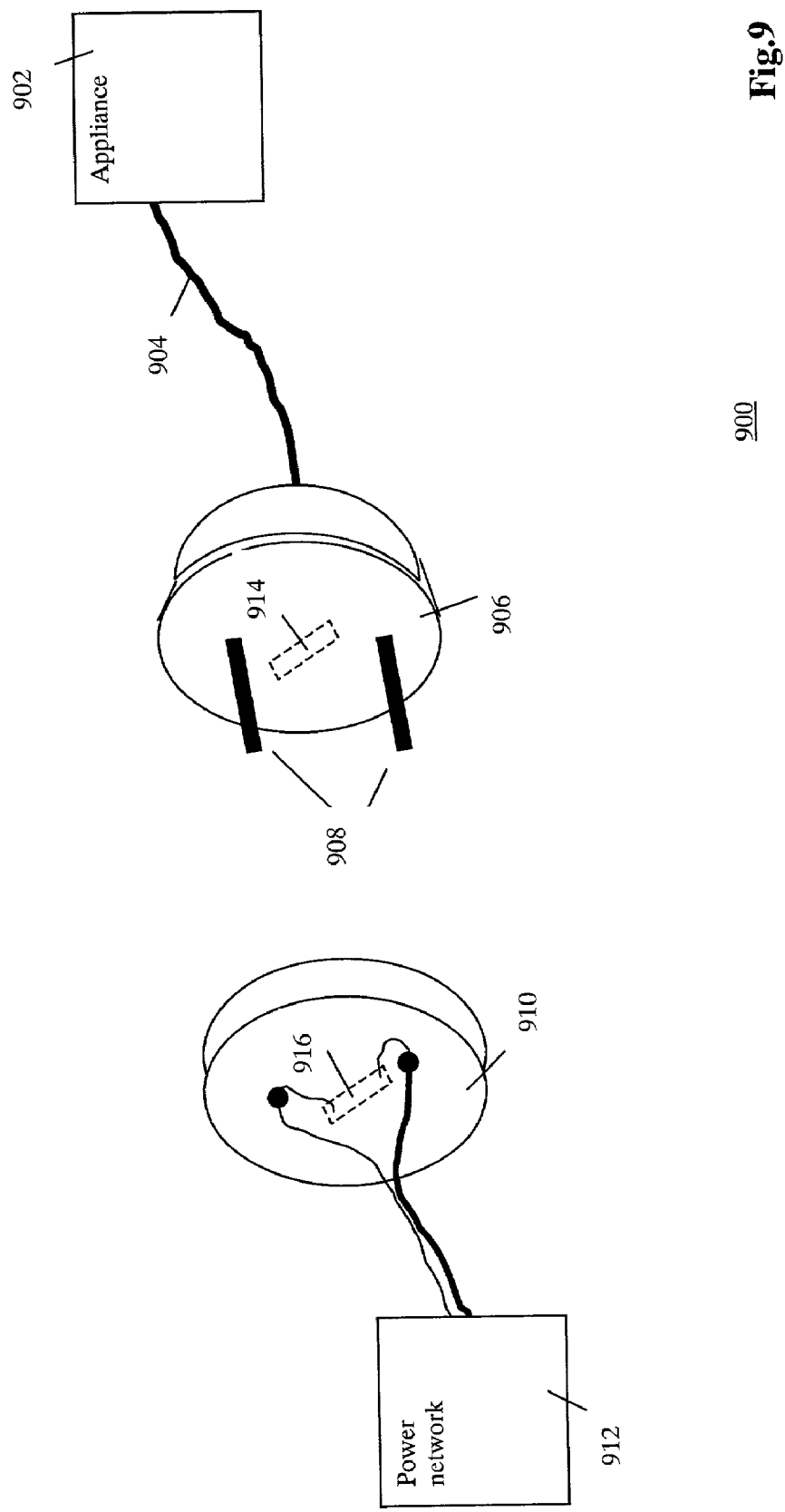

DEVICE IDENTIFICATION AND CONTROL IN NETWORK ENVIRONMENT

FIELD OF THE INVENTION

The invention relates to a system and method for device identification and control in a network environment and particularly for identification and control in home network or office network environment.

BACKGROUND ART

Device identification in a network environment is known. Typically, a network-compatible device carries its identification. The simplest case of such identification-based network is the conventional telephone network. Each line is assigned a number, which allows compatible phone clients to communicate with other phone clients. Another example is the Internet, where a computer or any other communication device needs to have an IP address in order to send/receive packets of data. Such networks are designed to handle large number of clients and their identification schemes are complex and expensive to implement. Similar addressing schemes are used in LANs and WANs. Governmental agencies and large corporations can afford a full-scale implementation.

Simpler device identification and control mechanisms are being used in home networks. An example of a simple protocol for a home/office network is the power-line based X-10 protocol. Each control module is identified by a combination of a letter and a number, manually set by an end-user or a system installer. X-10 control modules, when plugged into a power outlet, receive control signals from compatible devices (computers, X-10 controllers, etc.) over the power lines. When home appliances, such as lamps, TVs, VCRs and etc., are plugged into the X-10 control modules, their power supply is controlled by these control signals. Another example of a power-line based network has been developed by Intellon Corporation. (see www.intellon.com). Intellon's products enable implementing low-cost wireless networks using a Spread Spectrum Carrier technology for communication over power line and RF media. Similar home solutions exist for phoneline-based networks (see, e.g., the technology of Epigram Inc., now part of Broadcom Corporation, at www.epigram.com) and RF-based networks (see, e.g., www.x10.com/products/x10_vk22a_1.htm).

SUMMARY OF THE INVENTION

There are a number of problems inherent in the known network solutions. For example, control modules such as X-10 require manual configuration. When such networks have been set up for operational use, it is assumed that appliances are plugged into the appropriate control modules. If, by any chance, an appliance is unplugged, or is plugged into a different outlet or a power socket or into a different control module, control signals will still be sent to the designated address, as if nothing has changed. Simple configuration errors can render critical parts (e.g., security system, process automation system) of the network inoperable, or can give rise to undesirable results, as the result of a "wrong" appliance being plugged into the control module. Individual control modules are expensive, do not work with different network protocols and can be embedded into consumer appliances only at a significant additional cost.

Further, control modules are location-unaware. When moved to a different position the module retains its identification and therefore retains its network behavior. Network controllers cannot determine the module's location in order to implement a corresponding change in the network functionality. For example, if a control module for a bedroom lamp is moved into the living room and another lamp is plugged into it, the underlying control program needs to be modified in order to accommodate the change. Otherwise the living room lamp would work according to the rules associated with the bedroom lamp. Another solution would be to manually change the identifier of the control module and re-program the controller accordingly.

Legacy devices, for example Audio/Video equipment, present another problem for a control system. The user is usually required to manually identify the devices and configure appropriate control means, such as an IR remote control device.

Some or all of these drawbacks could be overcome by a number of measures, e.g., installation of a designated control network, employment of skilled network maintenance personal, etc. This approach is expensive and/or does not guarantee success in a fast changing environment.

Accordingly, there is a need to overcome one or more of the problems inherent in the known systems and methods for controlling appliances in a network environment so as to enable stability and robustness. There is a need to provide enhanced and new functionalities, particularly, but not limited to, easy set-up and maintenance of network-enabled appliances individually and of the network functionality as a whole.

One of the problems the invention seeks to solve can therefore be stated as having contradicting requirements. On the one hand, a control module and its controllable device(s) or appliance(s) should be mutually dependent in order to provide consistent control and addressability. On the other hand, the module and device should be mutually independent in order to be portable across locations, protocols, etc.

To this end, the invention provides a control system for enabling a controller to control a controllable appliance via a control network. The system comprises a module for interfacing the appliance to the network. The module obtains and assumes an identity of the appliance through coupling or another interaction with the appliance for enabling the controller to selectively control the appliance via the module.

The automatic projection of the appliance's identity onto the module enables the controller to selectively control the appliance via the module regardless of geographic location on the network. Also, the module can assume the identity of any appliance coupled to it of which the identity can be determined and transferred to the module. Accordingly, the module is a generic interface building block for a network to enable control of any appliance, whose identity can be automatically detected by the module.

The present invention overcomes problems inherent in the known systems by providing identification systems and methods enabling consistent and portable access to network resources. More specifically, the invention enables automatic and/or conditional access to network resources. The control module needs to assume the identity of the appliance to be controlled in order to represent its controllable functionality or its set of capabilities on the network. The module cannot really control any resource until the resource is functionally plugged into the network. On the other hand, the resource by itself does not necessarily have the means to be controlled by the network. For example, a regular TV set contains no knowledge about control network protocols, etc. So, a flexible combination of the control module and the controllable resource is required to provide network access to the resource. The identification of the device and/or its capabilities on the network can be made dependent on different conditions such as resource location, time, conditions of the environment, state of the controller (active, inactive), access permissions, etc. Therefore, the combination of an identifiable control module and controllable resource becomes a conditionally identified networked entity, capable of functioning as a shared addressable resource. The dynamic nature of the coupling allows for creation of simple appliances, independent of the specifics of a control protocol. It also allows for easy configuration and portability of the control modules. The desired identity coupling can be achieved by various binding mechanisms. For example, a binding mechanism can be based on smart cards or smart tags. Binding can be done by location/proximity, protocol compatibility, range of communication, etc. An identification element (information, data, code, XML tag, etc.) needs to be associated with the resource (appliance). It can be attached to or embedded into the appliance. Multiple identification pieces can be associated for multi-protocol or context purposes. Identification pieces, such as ICs, can be embedded into connectors (e.g., power plugs, network connectors, etc.) or other parts of the resource that are intended for connection or located in close proximity to other identifiable objects. An identification piece can be located, e.g., between power plug prongs to ensure the proximity to parts of a potential interacting control module or system. The information encoded into the piece can be modified or appended by the user. For example, the manufacturer supplies the standard information, such as model, year, serial number, etc., and the user can add functional, descriptive or context dependent information, such as "Grandma's lamp", <price><$123.45><bought><12-24-1998>, etc.

A combination of readers/ parts can be used to provide additional network functionality, for example, security. A bar code reader can be used in order to identify the device and a smart-card reader in order to upload digital signature, applet, etc. The control module can be a separate device or an embedded functionality. Control and binding systems can be (parts of) different physical networks, with a system controller mapping/reconciling those networks with each other in order to provide adequate information in order to control the resource. The network can detect the act of a resource disconnecting and an appropriate response can be taken. For example, disconnecting a life-critical support appliance could trigger an emergency response. Similarly, security, safety, state-tracking measures can be programmed into the system. The "last assumed functionality" can be remembered by the module or the system if necessary and for a pre-determined period of time. Control modules can be assigned resource capabilities for configuration, testing, modeling and other purposes. For example, attaching a "lamp" identifier to the module can set it up as a virtual lamp in order to test the functionality of the network or the control program. When an actual device is attached, the assigned "lamp" capabilities can be overridden by the plugged-in resource.

In summary, the invention relates to a combination of control modules and appliances. The modules serve to connect the appliances to a network. Through a binding mechanism the modules assume the identities of the appliances they serve to connect to the control network. The modules may comprise intelligence to enhance control functionalities and conditions.

BRIEF DESCRIPTION OF THE DRAWINGS

The invention is explained by way of example and with reference to the accompanying drawings, wherein:
FIG. 9 is a diagram of an implementation of a tag-reader combination.

Throughout the figures, same reference numerals indicate similar or corresponding features.

PREFERRED EMBODIMENTS

Figure 1:
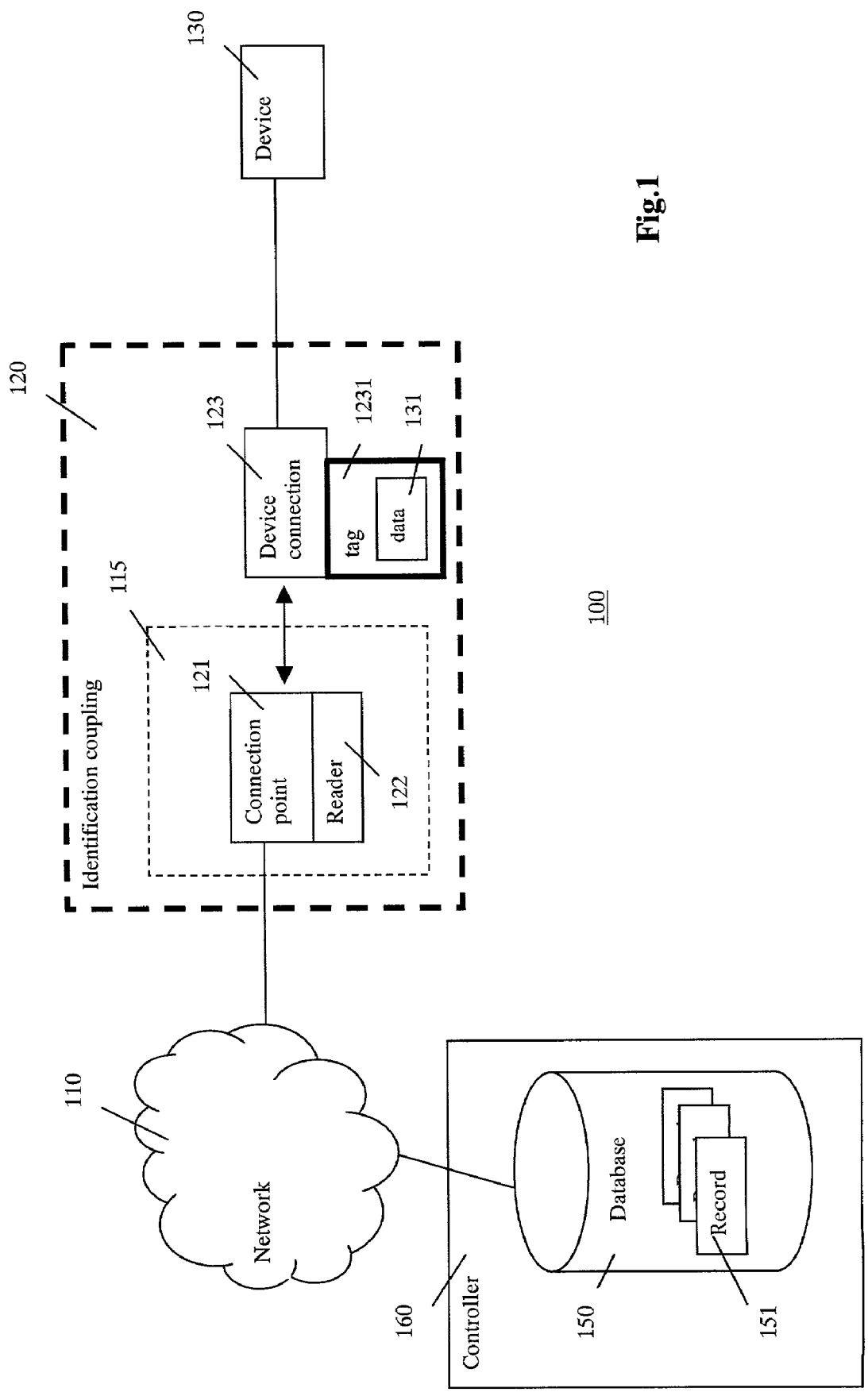
FIG. 1 is a block diagram of a system in the invention.

As mentioned above, the invention relates to a control system for enabling a controller to control an appliance on a control network. The system comprises a module for interfacing the appliance to the network. The module obtains identity information from the appliance through coupling with the appliance for enabling the controller to selectively control the appliance through the module. For example, the appliance has an identifier element that is read by the module when coupled with the appliance for assuming the identity. The identifier element couples in a galvanic, or alternatively, in a contactless, manner with the module.

The control network comprises, for example, a power line network. The appliance has a connector for connecting to the power line network, and the connector accommodates the identifier element. The module serves to connect the appliance to the power line network but also enables control via the power lines.

In another aspect of the invention, the appliance is rendered controllable through a module identifier of the module, representing the identity of the module, and through the identity information from the appliance as assumed by the module. The control functionality then can be made to depend on the appliance identity in combination with the module's identity, thus providing an extra degree of freedom in the control. In addition, or alternatively, the appliance is rendered controllable through information about a location of the module on the network when the appliance has been functionally connected to it.

The invention also relates to a module for use in a control system to enable a controller to control an appliance on a control network. The module interfaces the appliance to the network. The module adopts identity information from the appliance through coupling with the appliance. This enables the controller to selectively control the appliance through the module. Preferably, the module comprises a reader for reading the identity information from an identifier element of the appliance. Reading may be achieved in a contactless, e.g., capacitive or inductive or wireless (IR or RF), manner or galvanically by electric contacts. The module may, in addition to control, serve as an interface of the appliance to a power line network. The module has a module identifier for identifying the module for enabling to control the appliance under combined control of the identity information and the module identifier. The module may have a storage element for storing information about a location of the module on the network. One or more embodiments of the module thus interface an appliance to a control network, the module assuming an identity of the appliance upon coupling with the appliance.

The invention also relates to an appliance that has a component for storing identity information for being read by a module when coupled to the appliance. This enables to selectively control the appliance through the module. The component may allow for contactless reading of the identity information by the module. The component may be accommodated in a power plug of the appliance. The component may be a sticker or tag using, e.g., thin-film semiconductors or RF antennae, for being mounted to the appliance or its power plug.

The component may be programmable with identity information of the appliance for enabling supply of the identity information for control of the appliance. Programming is done by, e.g., the manufacturer, by an aftermarket service provider or by the end-user him/herself.

A service can be provided to an end-user of an appliance, wherein identity information of the appliance is provided for being programmed into a module for interfacing the appliance to a control network. In this manner, a generic control system can be set up including legacy appliances, or the programming can be marketed as an additional value-adding feature.

Figure 2:
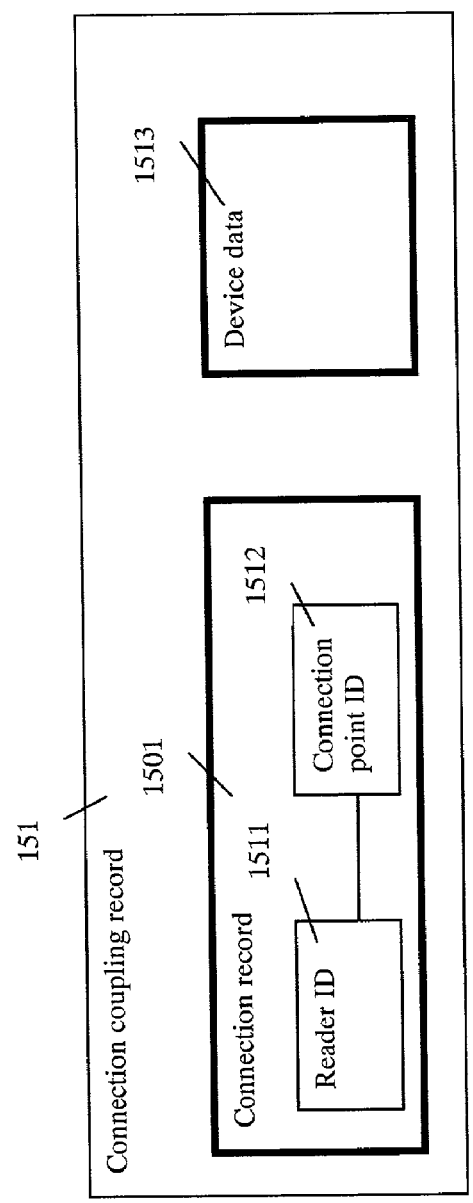
FIGS. 2, 3, 4 and 5 are diagrams illustrating couplings with data records to implement associations.

FIG. 1 is a block diagram of a control system 100 in the invention. System 100 comprises a network 110, an identification coupling 120, and a device or appliance 130 that is linked to network 110 via coupling 120. Coupling 120 comprises a connection point 121, a tag reader 122, a device connector 123 coupled to device 130 and a tag 1231 coupled to connector 123. In one of the possible implementations, connection point 121 and tag reader 122 are combined in, e.g., a network outlet or interface 115. Tag 1231 contains embedded data 131 associated with, or otherwise representative of, device 130 for the intended control purposes. A connection database 150 is attached to network 110. Database 150 stores coupling records 151. Database 150 resides on a network controller 160 or is distributed among multiple network controllers and/or identification couplings similar to coupling 120. As shown in FIG. 2, each record 151 forms an association between reader data 1511, connection point data 1512, and possibly one or more device data items 1513. Reader data 1511 is representative of the identity of reader 122. Connection point data 1512 is representative of the identity of connection point 121. Device data items are representative of the identity of device(s) 130. Preferably, record 151 is created at network configuration time with reader data 1511 and connection point data 1512. Record 151 is further populated whenever a new coupling 120 is created. For example, when device connector 123 is plugged into network outlet (or interface) 115, reader 122 obtains embedded data 131 from tag 1231. Data 131 is used to create device information 1513, which is added to record 151. Additional data items 131 can be added to record 151 when more devices are connected to connection point 121.

Figure 3:
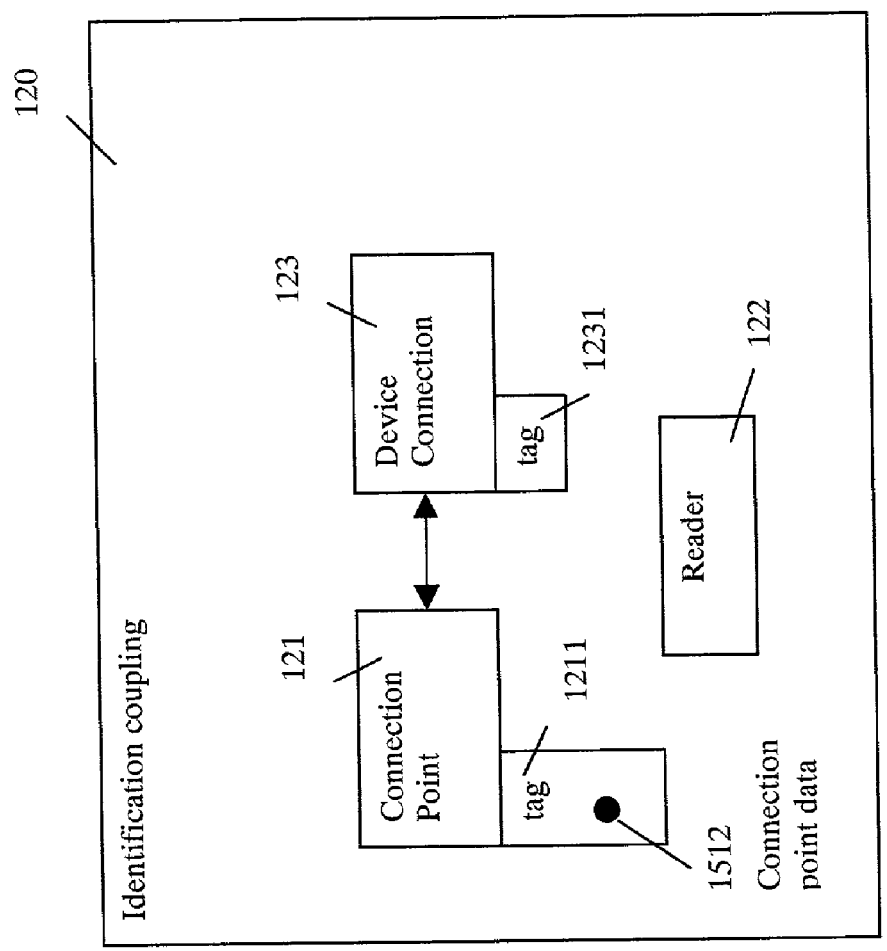

FIG. 3 is a diagram of an alternative implementation of coupling 120. Network outlet 115 comprises only connection point 121 with a tag 1211 that contains connection point information 1512, e.g., information about the location of connection point 121. Reader 122 is an independent component that can be attached to connection point 121.

Figure 4:
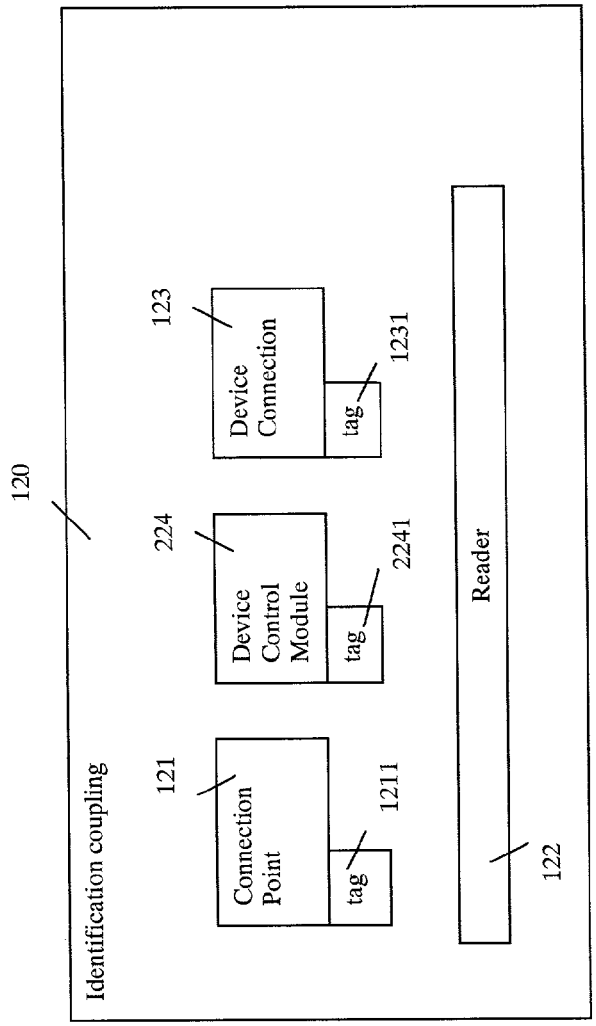
Figure 5:
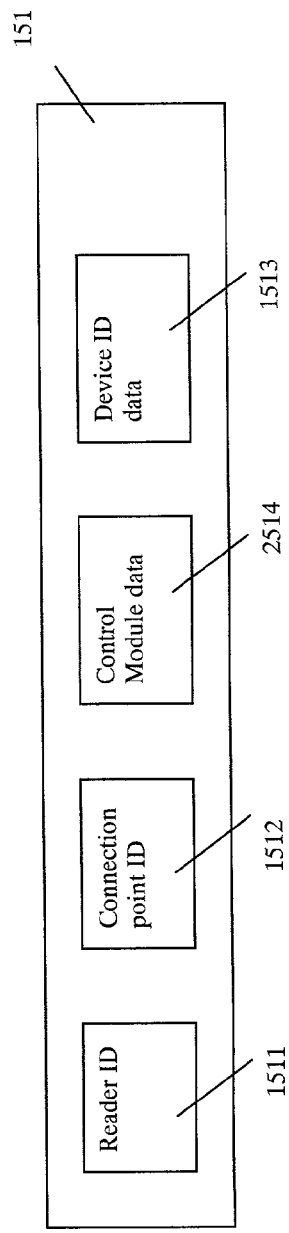

FIGS. 4 and 5 are diagrams illustrating another implementation of coupling 120 and record 151. Coupling 120 comprises connection point 121 with tag 1211, tag reader 122, device connection 123 with tag 1231 and a device control module 224 with a tag 2241. Tag 2241 contains control module data representative of control module 224. Coupling record 151 additionally comprises control module data 2514, e.g., a network address, that is created using data 2241. It should be understood that a number of combinations of the above mentioned components, e.g., connector 123 and module 224 or connection point 121, module 223 and reader 122, can be implemented as separate physical entities. In the invention, coupling 120 enables system 100 to identify and/or locate and/or control devices in an automated manner.

Figure 6:
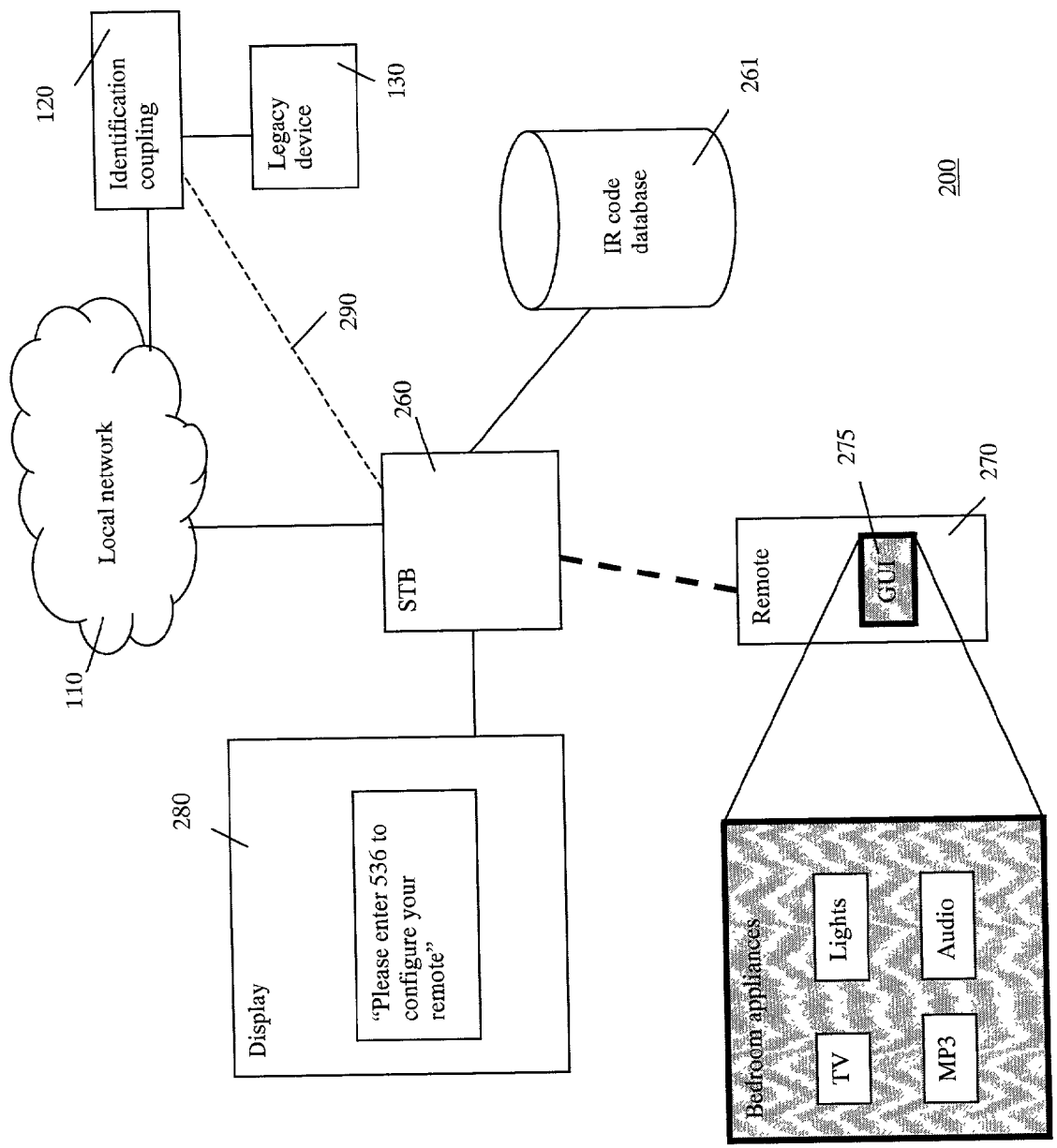
FIGS. 6, 7 and 8 are block diagrams illustrating examples of a system in the invention.

FIG. 6 is a block diagram of a control system 200 in the invention. System 200 comprises network 110, e.g., a power-line network, identification coupling 120, a legacy device 130, e.g., a VCR, a set-top box (STB) 260, a remote control device 270, and a display monitor 280. When VCR 130 is connected to network 110 via coupling 120 for the first time, coupling 120 notifies STB 260 of this event and sends to STB 260 device data 131 read from tag 1231. STB 260 uses data 131, e.g., to identify the manufacturer and the device type of VCR 130. Then STB 260 communicates with an IR codes look-up facility 261 to retrieve information required to configure remote control 270 for use with VCR 130. Display 280 may provide text messages with instructions to the user to complete configuration of remote 270. Preferably, STB 260 communicates directly with remote 270 to configure the latter, so that remote 270 is enabled to control VCR 130. In another implementation remote control 271 has a GUI with touch screen capabilities 275 that reflect the location of VCR 130, e.g., a specific bedroom. Within this context, reference is made to U.S. Ser. No. 09/210,416 filed Dec. 11, 1998, for Joost Kemink et al., for REMOTE CONTROL DEVICE WITH LOCATION DEPENDENT INTERFACE, herein incorporated by reference and corresponding to published International Application WO 0017737. This document relates to providing a user control interface that is location dependent within the home environment. Context control parameters are associated with location, and the user control interface is customized to the context within which the device is being operated. The control interface includes the presentation of context sensitive information and the communication of corresponding context sensitive user commands via the interface. The location determination is effected using any number of commonly available techniques, such as direct entry, infrared sensors and active badges for relative positioning, as well as the conventional absolute positioning devices such as LORAN and GPS. In a preferred embodiment, the device communicates with a remote information source that provides the context sensitive control information. The remote information source may be a home network server, an Internet server, a public service network, or other communication network.

In yet another implementation, STB 260 is enabled to communicate with coupling 120 via an alternative direct or networked link 290, using a proprietary or standard protocol, e.g. RF, BlueTooth, IEEE 802.11b.

Figure 7:
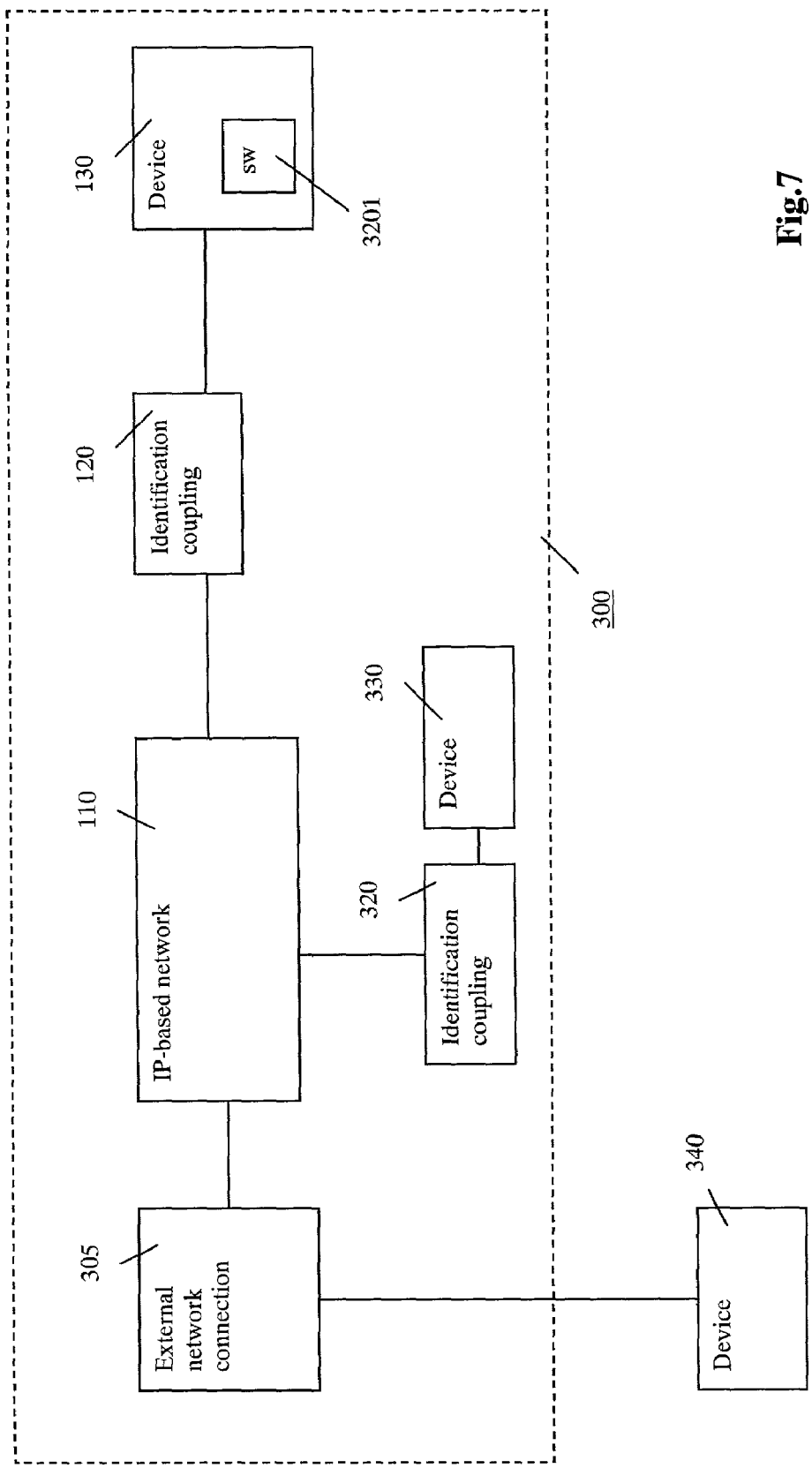

FIG. 7 is a block diagram of a secure network system 300 enabled by the invention. System 300 comprises an IP-based network 110, internal network couplings 120 and 320, network devices 130 and 330, and external network connection 305. A third party obtains an IP address of device 330 and, using a spoofing technique, sends malicious commands to device 130 from an external device 340 as if from device 330. Control software 3201 (e.g., a firewall) of the device 130 is configured to accept commands from devices with pre-determined IP addresses and with a previously identified physical locations, as provided by coupling 320, and subsequently rejects the malicious command. Preferably, location information is encrypted at the network set-up phase.

Figure 8:
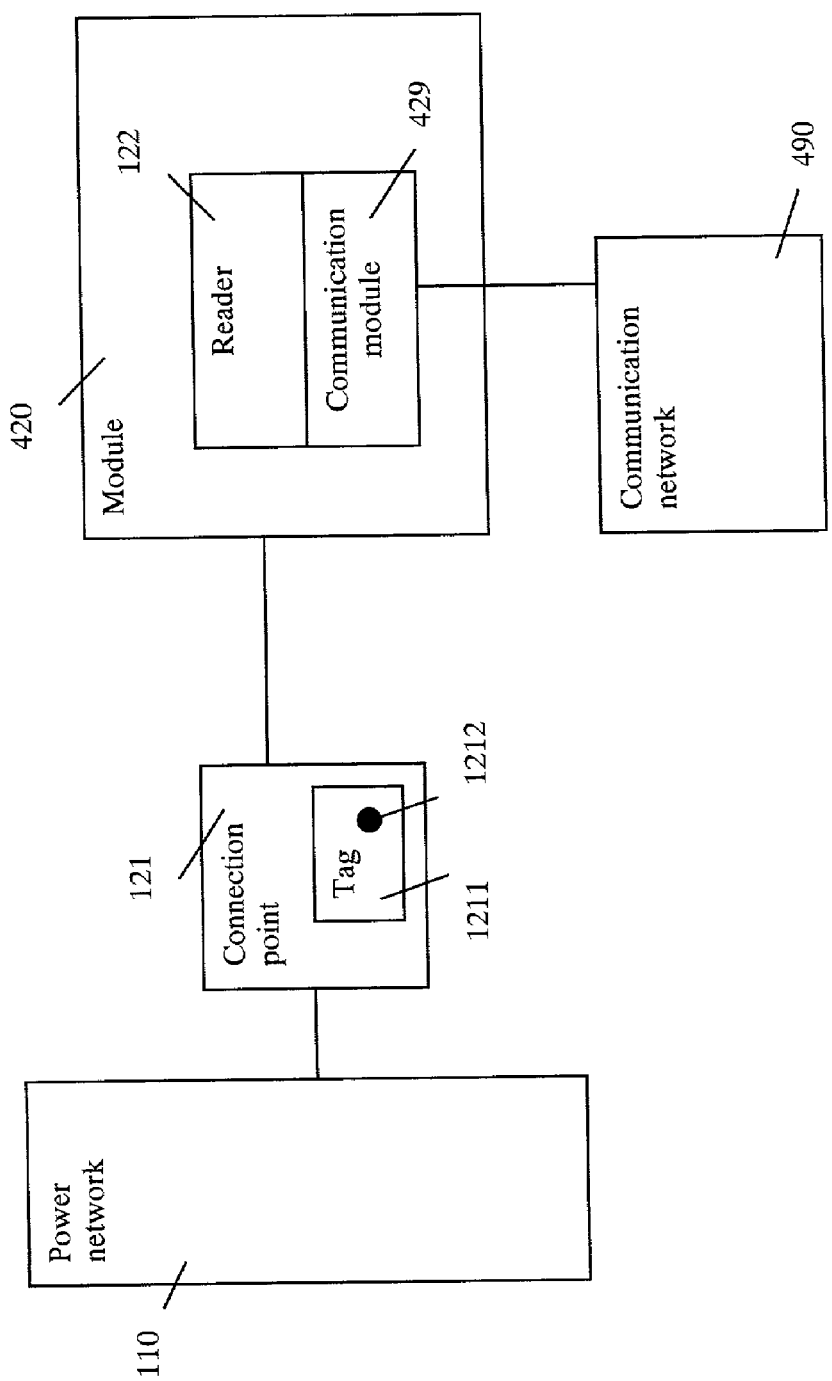

FIG. 8 is a block diagram of a mobile identification device in the invention. Module 420 comprises communicator 429 coupled to tag reader 122. Communicator 429 interacts with devices (not shown) on a communication network 490, using wired or wireless protocols, e.g., BlueTooth, IEEE 802.11b, IEEE 1394, IP, HAVi, UPnP, etc. Network 110, e.g. based on power line, has outlet 121 with tag 1211 that contains location-specific information 1212. Module 420 is plugged into outlet 121 and has access to information 1212. When devices on network 490 contact module 420, the latter provides them with location information 1212, associated with outlet 121. This information can be used to activate topology-specific applications and/or modes of operation for the devices. In another implementation, module 420 also serves as a communication protocol bridge between network 110, e.g., X-10 and network 490, BlueTooth.

FIG. 9 is a diagram illustrating a physical implementation of a tag/reader combination 900 in a power line network. An appliance 902 has a power cord 904 and a power plug 906. Plug 906 has prongs 908 for engaging with a socket or power strip 910 as an outlet of power network 912. The control system for control of appliance 902 is implemented using the power lines of network 912. Plug 906 has a tag 914 stuck onto it or embedded in the housing of plug 906. Tag 914 enables to identify appliance 902, e.g., through its manufacturer's serial number or identifications of its functionalities, etc. When plug 906 is inserted into socket 910 a reader 916 reads tag 914. In this example, tag 916 is powered via the power lines. The data read from tag 914 is transferred to the control system (not shown), together with location information of socket 910. Location-specific information may have been programmed in reader 916, so as to enable topology dependent applications. Accordingly, when appliance 902 is connected to the control network, a controller is enabled to control appliance 902 via the power lines using the tagged plug/socket combination for identifying the appliance to the network. The socket assumes an identity of appliance 902 through reading tag 914 for enabling the controller to selectively control the appliance via the socket. The reader ID, the information of tag 914 and the location of socket 910 serve, e.g., as a network address for appliance 902. An operational mode is, for example, conditional power supply under control of the correct network address as represented by the reader ID, the appliance's information and the location of the socket. For example, a label is attached to the appliance, e.g., to its power plug. The label has printed, passive components, among which an antenna formed by one or more loops of electrically conductive material. The antenna picks up a primary RF signal sent by the identification coupling or module. The frequency of the primary RF signal gets modified through one or more nonlinear element in the antenna loop. As a result a secondary RF signal is sent out by the antenna, now with different frequencies. The signal transmitted is picked up by the reader in the module. The secondary signal carries a unique signature of the label. For example, the frequency of the secondary signal is used to identify the label. Alternatively, the secondary signal is modulated by circuitry in the label that gets powered by the primary signal. In this manner, each label can be distinguished from another labels and can be identified by the module. The identity of the label is associated with the appliance and thus can serve as the input to, e.g., a look-up table.

Herein incorporated by reference are the following patent documents:

U.S. Ser. No. 09/653,784 filed Sep. 1, 2000, for Frank Caris et al., for STB CONNECTS REMOTE TO WEB SITE FOR CUSTOMIZED CODE DOWNLOADS. This document relates to marketing a set top box (STB) together with a programmable remote. The remote has a dedicated button to connect the STB to a specific server on the Internet. The consumer can notify the server of his/her other CE equipment, which he/she desires to be controllable through the same remote as the one that came with the STB. The server downloads to the STB data representative of the relevant control codes. The STB is provided with means to program the remote with these codes. In return the server has obtained detailed and accurate information about this consumer's equipment. A reliable customer base can thus be built for streamlining Help Desk operations.

U.S. Ser. No. 09/519,546 filed Mar. 6, 2000, for Erik Ekkel et al., for PERSONALIZING CE EQUIPMENT CONFIGURATION AT SERVER VIA WEB-ENABLED DEVICE. This document relates to facilitating the configuring of CE equipment by the consumer by means of delegating the configuring to an application server on the Internet. The consumer enters his/her preferences in a specific interactive Web page through a suitable user-interface of an Internet-enabled device, such as a PC or set-top box or digital cellphone. The application server generates the control data based on the preferences entered and downloads the control data to the CE equipment itself or to the Internet-enabled device.

U.S. Ser. No. 09/165,682 filed Oct. 2, 1998, for Eugene Shteyn for CONTROL PROPERTY IS MAPPED ONTO MODALLY COMPATIBLE GUI ELEMENT. This document relates to an information processing system, which has an electronic device and a controller for control of a functionality of the device. An abstract representation of the functionality is provided to the controller. The abstract representation exposes a modality of controlling the functionality. The controller enables controlling the functionality through interaction with the abstract representation. The modality controls associating the control of the functionality with a modally compatible controlling capability of the controller. The modality exposed can be, for example, "Boolean", "float", "integer array".

U.S. Ser. No. 09/165,683 filed Oct. 2, 1998, for Eugene Shteyn for CALLS IDENTIFY SCENARIO FOR CONTROL OF SOFTWARE OBJECTS VIA PROPERTY ROUTES. This document relates to an information processing system that has first and second physical components represented by a first and second software objects, respectively. Both objects have properties that are changeable through calls to the objects. The system enables registering a property route linking a first property of the first object to a second property of the second object so that a change in the first property causes the second call being issued to the second object upon invoking the property route. The input call to the first object comprises an identifier enabling to conditionally invoke the route. In this manner, routes belonging to different scenarios are being kept independent so that the system operates more reliable that without scenario identifiers.

U.S. Ser. No. 09/133,622 filed Aug. 13, 1998, for Larry Freeman for HOME-NETWORK AUTOCONFIGURATION. This document relates to automatically configuring two PC's in a network in order to share resources registered at the individual PC's. Services and resources local to one PC are registered with the other PC and vice versa. The registry hides whether a service or resource is remote or local. In operational use of the network, a resource or service local to one PC is addressable from the remote PC as if it were local to the latter. A home network of PC's is configured automatically in this manner.

U.S. Ser. No. 09/635,549 filed Aug. 10, 2000, for Eugene Shteyn for TOPICAL SERVICE PROVIDES CONTEXT INFORMATION FOR A HOME NETWORK. This document relates to making a consumer electronics apparatus an intuitive component of a user-interface to a topical server. A specific user-interaction with the apparatus or its proxy on the home network causes a request to be sent to a specific server on the Internet based on a predefined URL. The home network receives a particular web page from the server with content information dedicated to the context of use of the apparatus.

I claim:

1. A control system for enabling a controller to control an appliance on a control network, the system comprising a module for interfacing the appliance to the network, wherein the module obtains identity information from the appliance through coupling with the appliance for enabling the controller to selectively control the appliance through the module, the module adopting the identity information from the appliance so that the appliance is rendered controllable through a module identifier of the module and through the identity information from the appliance and assumed by the module.

2. The system of claim 1, wherein the appliance has an identifier element for being read by the module when coupled with the appliance for assuming the identity.

3. The system of claim 2, wherein the identifier element couples in a contactless manner with the module.

4. The system of claim 2, wherein: the control network comprises a power line network; the appliance has a connector for connecting to the power line network; the connector accommodates the identifier element; and the module connects the appliance to the power line network.

5. The system of claim 1, wherein the appliance is rendered controllable through information about a location of the module on the network.

6. For use in a control system for enabling a controller to control an appliance on a control network, a module for interfacing the appliance to the network, the module adopting identity information from the appliance through coupling with the appliance for enabling the controller to selectively control the appliance through the module so that the appliance is rendered controllable through a module identifier of the module and through the identity information from the appliance and assumed by the module.

7. The module of claim 6, comprising a reader for reading the identity information from an identifier element of the appliance.

8. The module of claim 6, wherein the module receives the identity information in a contactless manner from the appliance.

9. The module of claim 6, for interfacing the appliance to a power line network.

10. The module of claim 6, having a storage element for storing information about a location of the module on the network.

11. An appliance having a component for storing identity information for being read by a module when coupled to the appliance for enabling to selectively control the appliance through the module, the module adopting the identity information read from the appliance so that the appliance is rendered controllable through a module identifier of the module and through the identity information from the appliance and assumed by the module.

12. The appliance of claim 11, wherein the component allows for contactless reading of the identity information by the module.

13. The appliance of claim 11, wherein the component is accommodated in a power plug.

14. For use with an appliance, a component being programmable with identity information of the appliance for enabling supply of the identity information to a module adopting said supplied identity information for control of the appliance so that the appliance is rendered controllable through a module identifier of the module and through the identity information from the appliance and assumed by the module.

15. A method of providing a service to an end-user of an appliance, the method comprising providing identity information of the appliance for being programmed into a module, adopting said provided identity information, for interfacing the appliance to a control network so that the appliance is rendered controllable through a module identifier of the module and through the identity information from the appliance and assumed by the module.

* * * * *